(12) United States Patent
Kim

(10) Patent No.: US 9,062,151 B1
(45) Date of Patent: Jun. 23, 2015

(54) PROTEIN-CYANOACRYLATE NANOPARTICLES THAT IMPROVE WETTING PROPERTY OF MATERIALS

(71) Applicant: The United States of America as represented by the Secretary of Agriculture, Washington, DC (US)

(72) Inventor: Sanghoon Kim, Washington, IL (US)

(73) Assignee: The United States of America, as represented by The Secretary of Agiculture, Washington, DC (US)

( * ) Notice: Subject to any disclaimer, the term of this patent is extended or adjusted under 35 U.S.C. 154(b) by 0 days.

(21) Appl. No.: 13/768,069

(22) Filed: Feb. 15, 2013

Related U.S. Application Data

(60) Provisional application No. 61/703,850, filed on Sep. 21, 2012.

(51) Int. Cl.
  *C08L 77/00* (2006.01)
  *C08G 69/10* (2006.01)

(52) U.S. Cl.
  CPC ....................................... *C08G 69/10* (2013.01)

(58) Field of Classification Search
  CPC .................................................. Y10S 977/714
  See application file for complete search history.

(56) References Cited

U.S. PATENT DOCUMENTS

| | | | |
|---|---|---|---|
| 6,998,137 B2 | 2/2006 | Shih et al. | |
| 2004/0028635 A1 | 2/2004 | Chauvierre et al. | |
| 2010/0190924 A1 | 7/2010 | Kim | |
| 2013/0004450 A1* | 1/2013 | Chahal et al. | 424/70.14 |

OTHER PUBLICATIONS

Reukov et al., Biotechnology and Bioengineering, vol. 108, No. 2, pp. 243-252.*
Kim, Sanghoon, "Production of poly(alkyl cyanoacrylate) nanoparticles as a coating material that changes wetting property", Abstract for 8th International Symposium on Contact Angle, Wettability, and Adhesion, Jun. 13-15, 2012, Quebec, Canada, posted online Jan. 2012.
Soppimath, Kumaresh S. , et al, "Biodegradable polymeric nanoparticles as drug delivery Devices", Journal of Controlled Release, 2001, vol. 70, pp. 1-20.
Vauthier, Christine, et al., "Poly(alkylcyanoacrylates) as biodegradable materials for biomedical applications" Advanced Drug Delivery Reviews, 2003, vol. 55, pp. 519-548.

* cited by examiner

*Primary Examiner* — Susannah Chung
*Assistant Examiner* — Robert T Butcher
(74) *Attorney, Agent, or Firm* — John D. Fado; G. Byron Stover

(57) ABSTRACT

Nanoparticles which are comprised of a protein-poly(alkyl-cyanoacrylate) or protein-poly(alkenyl-cyanoacrylate) copolymer may be used as a surface treatment to alter the wetting properties of a variety of different materials. The nanoparticles are produced by the method comprising:
a) providing a solution of a protein in an aqueous organic solvent mixture such as an acidified aqueous alcohol;
b) adding an alkyl- or alkenyl-cyanoacrylate and mixing under conditions effective to react with the protein and produce the nanoparticles comprised of a protein-poly (alkyl-cyanoacrylate) or protein-poly(alkenyl-cyanoacrylate) copolymer; and
c) recovering the nanoparticles.
The nanoparticles are amphiphilic, and may alter the surface-wetting properties of an object when applied onto the surface thereof. When applied onto hydrophobic surfaces, the nanoparticles render the surfaces hydrophilic.

35 Claims, 5 Drawing Sheets

PROTEIN-CYANOACRYLATE NANOPARTICLES THAT IMPROVE WETTING PROPERTY OF MATERIALS

CROSS-REFERENCE TO RELATED APPLICATIONS

This application claims the benefit under 35 U.S.C. 1.19(e) of U.S. provisional 61/703,850, filed Sep. 21, 2012, the contents of which are incorporated by reference herein.

BACKGROUND OF THE INVENTION

1. Field of the Invention

This invention relates to novel nanoparticles comprised of a protein-poly(aliphatic-cyanoacrylate) copolymer and a process for their production. The nanoparticles may be used as a surface treatment to alter the wetting properties of a variety of different materials.

2. Description of the Prior Art

Alkyl-2-cyanoacrylates, usually the products of condensation of formaldehyde with cyanoacetate, are low viscosity liquids with excellent wetting properties. Alkyl-2-cyanoacrylates undergo spontaneous anionic polymerization to form poly(alkyl-cyanoacrylate) (PACA) a degradable polymer. The polymerization occurs at room temperature and is initiated by anionic active species, such as weak bases including moisture and alcohol, amines, phosphines, and alkaline materials, due to the unique electron withdrawing properties of nitrile and carboxylate groups substituted on carbon 2. In addition to the ability to polymerize rapidly (at room temperature in absence of a catalyst) and good wetting properties, the high polarity and high bond strength between various adherents make the properties of the alky-2-cyanoacrylate unique. As a result, the alkyl-2-cyanoacrylates have wide range of applications, including instantaneous adhesives for rubbers, plastics, metals, glass and the like, and are commonly known as "super glue." Alkyl-2-cyanoacrylates also have been used as tissue adhesives for the treatment of skin wounds and as surgical glues due to their bonding properties with most polar substrates, including living tissues and skin and biocompatible properties. Recently, PACA has been used as polymer colloidal drug delivery systems, especially for treatment of cancers and intracellular infections.

Although alkyl-2-cyanoacrylates are commonly polymerized by anionic polymerization, they also can be prepared by free radical polymerization methods. The resulting poly(alkyl-2-cyanoacrylates) are basically hard, colorless, and amorphous polymers. Physical properties of these polymers are variable, dependent on the size of the alkyl substituent, molecular weight, polymerization conditions and methods, and contaminants. However, the use of cyanoacrylate polymer as conventional plastic materials has been seldom studied. This may be due to the fact that retropolymerization reaction or degradation at elevated temperatures restricts the use of this polymer where the prolonged service temperature is below 100° C. Furthermore, there is no report on polymer composites using cyanoacrylate, although its fast, easy polymerization and relatively good mechanical properties should allow for facile production of polymer composites (see Kung et al., Macromolecules, 33:8192-8199, 2000).

Alkyl cyanoacrylate is a major component of a well-known adhesive, "super glue", that was introduced in the early 1970s. The preparation of alkyl cyanoacrylate esters was first reported by scientists at B. F. Goodrich in 1949, and these monomers were observed to produce hard, glassy polymers after thermal polymerization (Ardis, 1949, U.S. Pat. No. 2,467,926). Alkyl cyanoacrylate esters could effectively perform as one-part liquid adhesives, which would cure rapidly at room temperature. Unlike epoxy or acrylic adhesives, alkyl cyanoacrylate adhesives polymerize, in many cases, without the need for an added initiator or curing agent. The first cyanoacrylate instant adhesive, Eastman 910, which utilized methyl cyanoacrylate as the monomer, was marketed in 1958. Because of the ability of the cyanoacrylates to bond to a wide variety of substrates, cyanoacrylate instant adhesives are now produced in multi-ton quantities for both industrial and consumer applications.

SUMMARY OF THE INVENTION

Novel nanoparticles which are comprised of a protein-poly(aliphatic-cyanoacrylate) copolymer and a process for their production have been discovered. These nanoparticles may be used as a surface treatment to alter the wetting properties of a variety of different materials. The protein-poly(aliphatic-cyanoacrylate) copolymer nanoparticles are produced by the method comprising:

a) providing a solution of a protein in an aqueous organic solvent mixture such as an acidified aqueous alcohol;

b) adding an aliphatic-cyanoacrylate and mixing under conditions effective to react with the protein and produce the nanoparticles comprised of a protein-poly(aliphatic-cyanoacrylate) copolymer; and c) recovering the nanoparticles.

The reaction can be conducted under mild conditions without the addition or use of catalyst or additional polymerization initiator. The resultant nanoparticles are amphiphilic, and may alter the surface-wetting properties of an object when applied onto the surface thereof in an effective amount. When applied onto hydrophobic surfaces, the nanoparticles render the surfaces hydrophilic.

In accordance with this discovery, it is an object of this invention to provide novel nanoparticles formed of proteins and aliphatic-cyanoacrylates that are effective to modify the surface-wetting properties of a wide variety of objects.

Another object of this invention is to provide amphiphilic nanoparticles formed of proteins and aliphatic-cyanoacrylates that are effective to render hydrophobic surfaces hydrophilic.

A further object of this invention is to provide amphiphilic nanoparticles formed of proteins and aliphatic-cyanoacrylates that are effective as coatings for windows and other transparent surfaces without significantly altering their transparency.

Yet another object of this invention is to provide a method for producing nanoparticles from proteins and aliphatic-cyanoacrylates.

A still further another object of this invention is to provide a simple method for producing nanoparticles from proteins and aliphatic-cyanoacrylates without the need for catalysts or additional polymerization initiators.

Other objects and advantages of the invention will become readily apparent from the ensuing description.

DETAILED DESCRIPTION OF THE INVENTION

Figure 1:
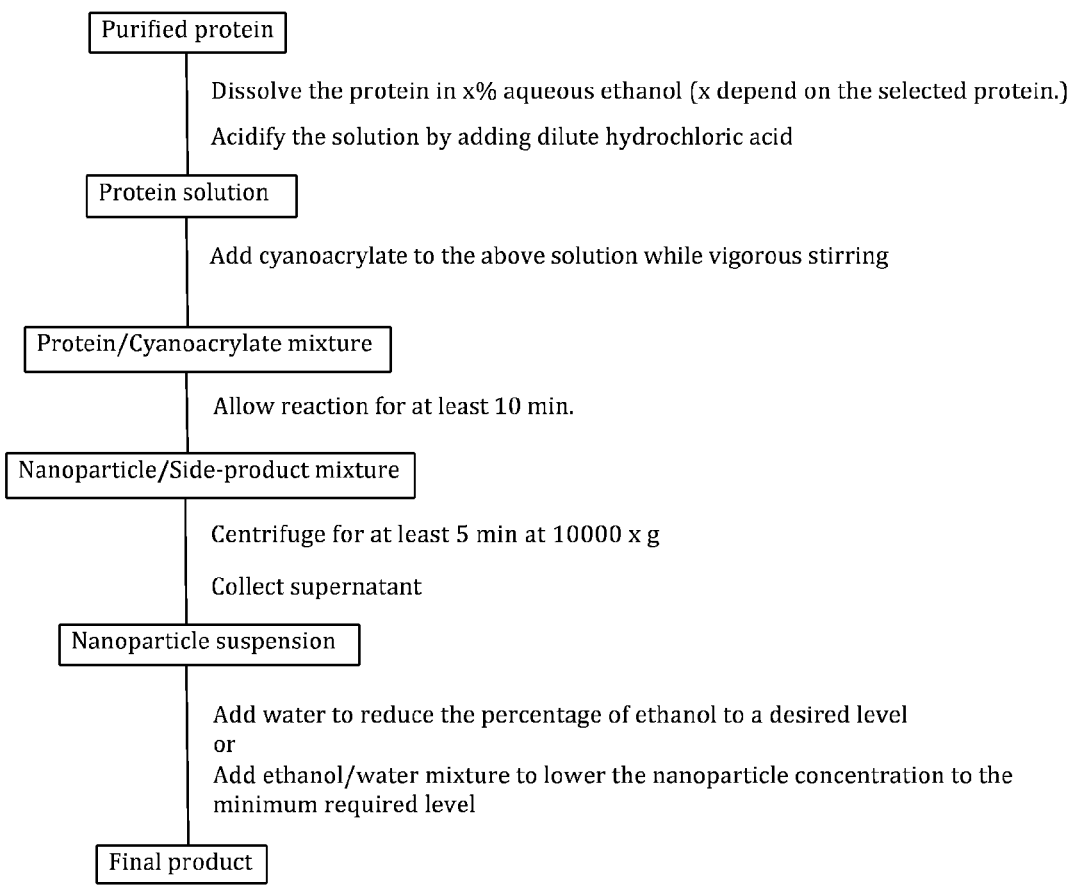
FIG. 1 shows a flow diagram of a process for making the nanoparticles from proteins and aliphatic-cyanoacrylates in accordance with a first preferred embodiment.

The process described herein produces nanoparticles comprised of a protein-poly(aliphatic-cyanoacrylate) copolymer. The process may produce either or both of a block copolymer, having a single poly(aliphatic-cyanoacrylate) moiety polymerized to the protein molecule, or a star copolymer having more than one poly(aliphatic-cyanoacrylate) moieties polymerized to a single protein molecule. The process may be used with a variety of proteins, including those of plant, animal, microbial or synthetic origin. The proteins may be water soluble or insoluble (soluble in ethanol or other organic solvent if not water soluble), and may be complex proteins such as casein or simple proteins such as prolamins. Without being limited thereto, preferred proteins include gliadin, soy protein and bovine serum albumin. The protein may be obtained from a variety of commercial sources, or in the alternative, recovered directly from a plant, animal or microbial material, or synthesized, all using techniques which are well known in the art. Although the reaction to produce the copolymer does not require protein of a high degree of purity, the efficacy of the resultant nanoparticles for altering wetting properties may be reduced if crude protein formulations are used. Consequently, as starting materials for the reaction, the protein is typically used in a pure or semi-pure form.

A variety of aliphatic-cyanoacrylates may also be used in the reaction with the proteins. As used herein, the term aliphatic-cyanoacrylates encompasses both alkyl-cyanoacrylates and alkenyl-cyanoacrylates. Aliphatic-cyanoacrylates which are suitable for use herein may also be referred to as aliphatic-2-cyanoacrylates, and are of the formula $CH_2{:}C(CN)COOR$, wherein R is an aliphatic hydrocarbon moiety, which may be a branched or straight chain, saturated or unsaturated, and optionally substituted. In a preferred embodiment, R is a C1 to C8 aliphatic hydrocarbon, more preferably a C1 to C8 alkyl moiety. Particularly preferred aliphatic-cyanoacrylates for use herein include, but are not limited to, methyl-2-cyanoacrylate, ethyl-2-cyanoacrylate, n-propyl-2-cyanoacrylate, isopropyl-2-cyanoacrylate, n-butyl-2-cyanoacrylate, isobutyl-2-cyanoacrylate, n-pentyl-2-cyanoacrylate, isopentyl-2-cyanoacrylate, 3-acetoxypropyl-2-cyanoacrylate, 2-methoxypropyl-2-cyanoacrylate, 3-chloropropyl-2-cyanoacrylate, alkenyl-2-cyanoacrylates, alkoxyalkyl-2-cyanoacrylates or combinations thereof.

The reaction of the protein and aliphatic-cyanoacrylate is conducted under conditions and for a period of time effective for the protein to polymerize with the cyanoacrylate. The reaction proceeds rapidly under mild temperature conditions (room temperature). The reaction should be conducted in an aqueous alcohol or other aqueous organic solvent mixture to facilitate solution formation and contact of the protein and cyanoacrylate reactants. Suitable solvents include, but are not limited to methanol, ethanol, propanol, acetic acid, acetonitrile, acetone or combinations thereof, with ethanol being preferred. Thus, the protein may be dissolved in an amount of aqueous alcohol solution or other aqueous organic solvent mixture effective to dissolve the protein prior to reaction. The alcohol solution or other aqueous organic solvent mixture should be acidified by addition of a mineral acid such as hydrochloric acid. The alcohol content of the aqueous alcohol solution is quite variable, and will typically be higher for water insoluble proteins such as gliadin. For example, aqueous alcohol solutions may vary between about 10 to 90% alcohol, by weight, preferably between about 30 to 70% (other aqueous organic solvent mixtures may vary between about 10 to 100% organic solvent). The total amount of alcohol added will of course vary with the type of protein. The percentage of protein is typically between about 0.05 to 2%, by weight of the mixture, although higher amounts up to 10% or more may be used.

The aliphatic-cyanoacrylate is added to the protein in alcohol solution with vigorous mixing or agitation, facilitating nanoparticle formation. The polymerization of the aliphatic-cyanoacrylate is initiated by the protein, specifically by the amine groups thereof, and thus the reaction does not require the use of additional or other polymerization initiators. Moreover, the process does not require the addition of stabilizing agents, including ionic or non-ionic surfactants, block copolymers or emulsifiers, which are used in the production of cyanoacrylate nanoparticles by other methods (Seijo et al., Int J Pharm, 62:1-7, 1990; Kreuter et al., Int J Pharm, 16:105-113, 1983; and EL-Egakey et al., J Int J Pharm, 13:349-352, 1983). The relative amounts of aliphatic cyanoacrylate to protein will vary with the particular protein and aliphatic-cyanoacrylate used, and the desired application (end use) of the protein-poly(aliphatic-cyanoacrylate) copolymer nanoparticles to be produced. In general, increasing the amount of the cyanoacrylate relative the protein will increase the hydrophobicity of the nanoparticles produced, while increasing the amount of the protein relative to the cyanoacrylate will increase the hydrophilicity of the nanoparticles. The actual relative amount used may be readily determined by routine experimentation. By way of example and without being limited thereto, the relative amount of aliphatic cyanoacrylate to protein will typically vary between about 19:1 and 1:2 (95% to 33% acrylate monomer), by weight, with ratios between 9:1 and 1:1 (90% to 50% acrylate monomer) being preferred. The polymerization reaction proceeds rapidly, and reaches completion with consumption of the cyanoacrylate monomers in a manner of minutes at room temperature, with reaction times of 10 minutes to about 2 hours being preferred. The reaction may be optionally terminated by the addition of a cation or acid. The nanoparticles which are produced may be isolated or separated from the reaction medium using conventional techniques, such as by filtration or centrifugation.

Figure 2:
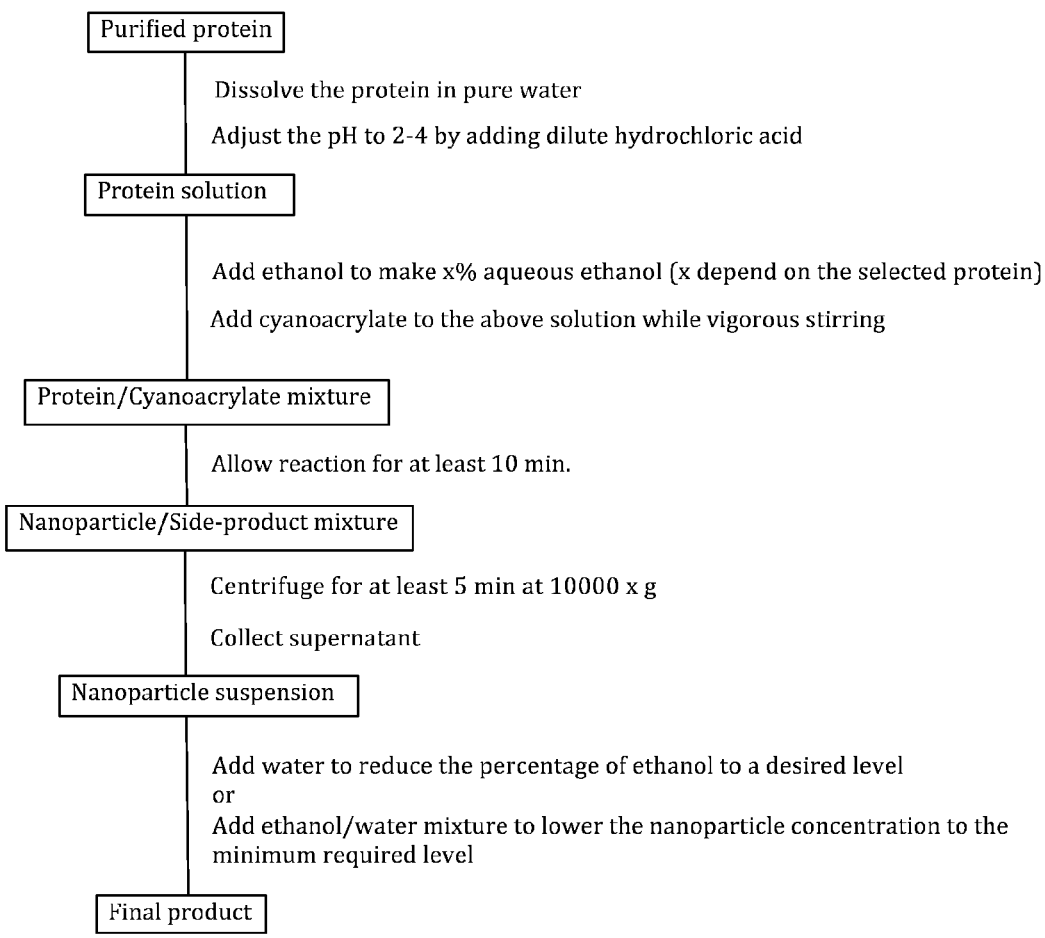
FIG. 2 shows a flow diagram of a process for making the nanoparticles from water-soluble proteins and aliphatic-cyanoacrylates in accordance with an alternative embodiment wherein the proteins are initially dissolved in water.
Figure 3:
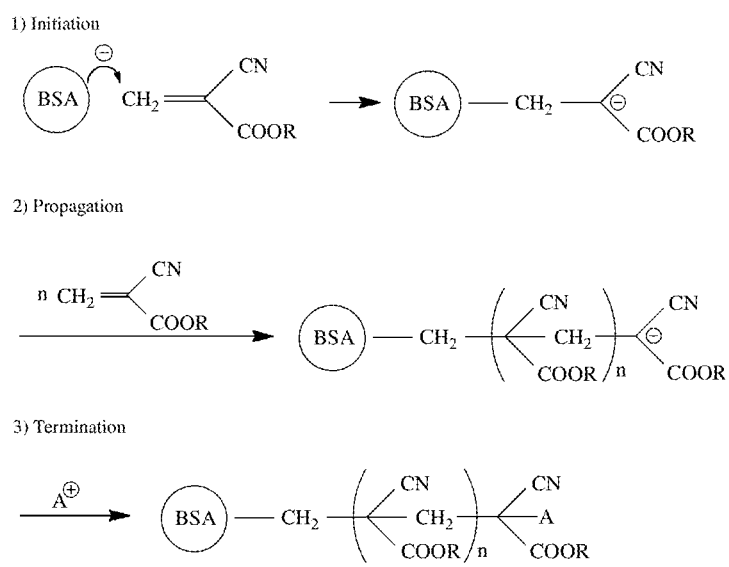
FIG. 3 shows the reaction mechanism of cyanoacylate polymerization initiated with protein (BSA) as described in Example 1. Production of a block copolymer is illustrated.

FIG. 1 shows an example of a process for making the nanoparticles in accordance with a preferred embodiment, while FIG. 2 shows an example of an alternative embodiment for use with water-soluble proteins. Although the water-soluble proteins in this alternative embodiment are initially dissolved in water, it is understood that some water soluble proteins are also soluble in the aqueous alcohol solution, and thus may be reacted in accordance with the preferred embodiment of FIG. 1.

The copolymer comprising protein and an aliphatic-cyanoacrylate which is produced by the reaction is a copolymer having the structure:

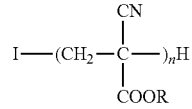

wherein n is an integer greater than 1, I is a protein, and R is as described above, that is, an aliphatic hydrocarbon moiety, which may be a branched or straight chain, saturated or unsaturated, and optionally substituted. In a preferred embodiment, R is a C1 to C8 aliphatic hydrocarbon, more preferably a C1 to C8 alkyl moiety. Although the production of a block copolymer with a single cyanoacrylate moiety polymerized directly to the protein molecule is illustrated, it is understood that more than one cyanoacrylate moieties may be directly polymerized to a single protein, thereby producing a star copolymer. The copolymer is amphiphilic, with the protein moieties being hydrophilic and the cyanoacrylate moieties being hydrophobic.

The size of the nanoparticles produced during the reaction is not critical, and will vary with the protein used, the amount of cyanoacrylate, pH, etc. For example, a pH between about 2 to 4 is preferred. Without being limited thereto, nanoparticles will typically be between about 50 to 500 nm, preferably between about 50 to 200 nm.

Upon recovery from the reaction medium, the protein-poly (aliphatic-cyanoacrylate) copolymer nanoparticles may be formulated by adding water as a diluent. Water addition functions to reduce the concentration of any residual alcohol present. The prepared suspensions may be applied onto surfaces, for example, by spraying or brushing.

The protein-poly(aliphatic-cyanoacrylate) copolymer nanoparticles exhibit rapid, strong adsorption behavior onto the surface of a variety of hydrophobic materials, primarily as a result of the presence of the hydrophobic cyanoacrylate moieties. However, because of the presence of the protein moieties, the affinity of the treated surface to water is greatly increased. Thus, when treated articles are subsequently exposed to rainfall or water, the water will form a thin film on the surface thereof rather than beads or droplets. Furthermore, treatment with the nanoparticles does not significantly change the transparency of the surface. When the nanoparticles are applied onto articles having transparent or translucent surfaces such as windows or lenses, or reflective surfaces such as mirrors, upon exposure of the surfaces to water (e.g. as rainfall, steam, condensation or dipping) the visibility is greatly improved relative to untreated surfaces. The nanoparticles may also be applied onto opaque or other surfaces such as in self-cleaning applications.

As a result of the ability of the protein-poly(aliphatic-cyanoacrylate) copolymer nanoparticles to alter the surface wetting property of treated articles, the nanoparticles may be used for treating the surfaces of any article exposed to water, particularly but not limited to surfaces which are exposed to the environment. Thus treated surfaces may comprise glass, plexiglass, organic polymers, inorganic materials or combinations thereof. Specific applications may include treatment of windows (buildings, automobiles, aircraft, watercraft or other vehicles), mirrors, lenses (glasses, goggles or masks) and solar cells.

The following examples are intended only to further illustrate the invention and are not intended to limit the scope of the invention which is defined by the claims.

Example 1

Materials and Methods

Ethyl cyanoacrylate (ECA) monomer (E-Z Bond, viscosity; 5 cps) was purchased from K&R International (Laguna Niguel, Calif.). BSA (Bovine serum albumin) was purchased from Sigma (St. Louis, Mo.). Ethanol and Hydrochloric acid were reagent grade.

Preparation of Nanoparticle Suspensions

Particles were prepared by emulsion polymerization of ethyl cyanoacrylate. 20 mg of BSA was dissolved in 10 g of x wt % ($25<x<50$) aqueous ethanol solution that was premixed with 40 µL of 4N HCl. Then y µL ($40<y<320$) of ECA was slowly added while constant stirring with a magnetic stirrer at 500 rpm. Reaction time was set to 10 min. As reaction proceeds, turbidity was developed indicating nanoparticles were formed in the reaction medium. The resultant nanoparticle suspension was centrifuged at 1000×g for 20 min. Supernatant was collected for the next experiment and the weight of precipitate was measured after drying overnight to calculate the yield of nanoparticle production.

Particle Size Measurement

Dynamic light scattering (DLS) experiments were carried out with the dispersions using a Particle Size Analyzer equipped with a 658 nm diode laser and an Avalanche photodiode detector (APD) (Model 90 Plus, Brookhaven Instruments Corporation, Holtsville, N.Y., USA). All the samples (prepared by the procedure in the previous section) were diluted twenty times with the same solvent, and measurements were performed without filtration. All measurements were done at a 90° detection angle at 20.0° C. For each sample, ten DLS measurements were conducted and each run lasted 30 s. All measurements were processed using the software supplied by the manufacturer (9kpsdw, v.5.31), which provided the mean hydrodynamic diameter via a multimodal analysis. Data from ten measurements were averaged to obtain the size of nanoparticles.

Adsorption of Nanoparticle

Nanoparticle adsorption onto silica was monitored using a Quartz crystal microbalance (QCM-E4 electronic system with axial flow, Q-Sense, Inc., Västra Frölunda, Sweden) (Rodahl et al., Rev Sci Instrum, 66:3924-3930, 1995). Nanopure water was passed over the crystals prior to measurements to equilibrate the system. Once the signal remained stable, ethanol/water was passed over the crystals and allowed to equilibrate to where frequency shifts were stable ($\Delta f<1$ Hz). Nanoparticles in ethanol/water solution were then passed over the crystals, allowed to adsorb and equilibrate. Finally, nanopure water was passed over the crystals to determine the amount of irreversibly bound nanoparticles. Data consisted of frequency shifts of 5 MHz fundamental frequency and the 3rd, 5th, $7^{th}$, $9^{th}$, $11^{th}$, and $13^{th}$ overtones (15, 25, 35, 45, 55, 65 MHz). All measurements were conducted at 20±0.05° C.

Results and Discussion

For the production of nanoparticles, anionic polymerization has been commonly used with hydroxyl ions as an initiator (Vauthier et al., Adv Drug Deliver Rev, 55:519-548, 2003). For this project, amine group(s) on the surface of BSA molecules were used as an initiator. As a result of this polymerization, copolymers are produced. Since BSA is hydrophilic and poly(ethyl cyanoacrylate) is hydrophobic, the resultant copolymer behaves as an amphiphile. These copolymers can form micelles in the solution.

In the case of conventional synthesis of nanoparticles from cyanoacrylates, nanoparticles are fabricated in an aqueous medium that was acidified with hydrochloric acid. Since cyanoacrylates are hydrophobic monomers, they are not soluble in water. Therefore, reaction is performed via emulsion polymerization while the reactant mixture is vigorously stirred (Behan et al., Biomaterials, 22:1335-1344, 2001). This type of two-phase reaction is slow and produces particles with broad size distribution. According to our reaction scheme, amine groups on the surface of protein (BSA) molecules react with ECA. To avoid two-phase reaction, ethanol/water mixture was chosen as a reaction medium. Addition of ethanol to acidic water turns the solution more hydrophobic, allowing both BSA and ECA dissolve in the same reaction medium. Acidic condition was necessary to control the size of nanoparticles. Neutral water supplies high concentrations of hydroxyl ions which make large chunks of poly(alkyl cyanoacrylate) aggregates instead of nanoparticles. It is known that the size distribution of produced nanoparticles depends on the pH of the reaction medium (Behan et al., ibid).

Figure 4:
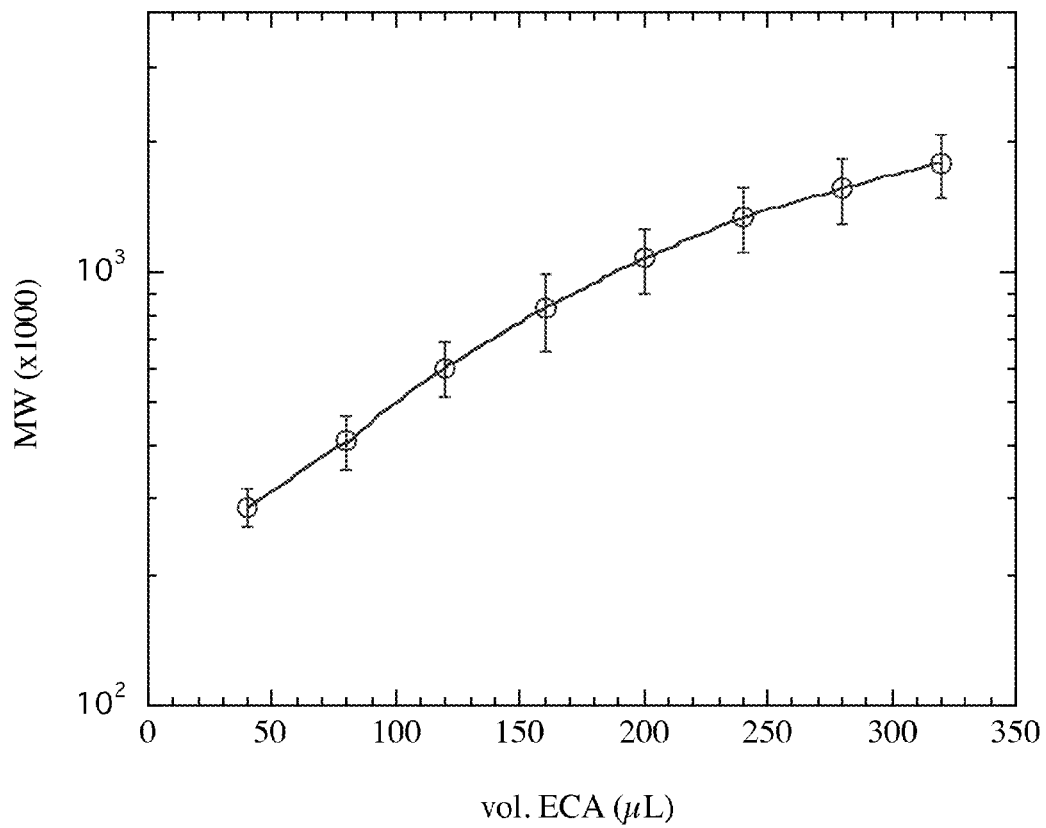
FIG. 4 shows the relationship between molecular weight (MW) of nanoparticle and amount of added ethyl-cyanoacrylate (ECA) as described in Example 1. 20 mg of BSA has been used as an initiator for each reaction.
Figure 5:
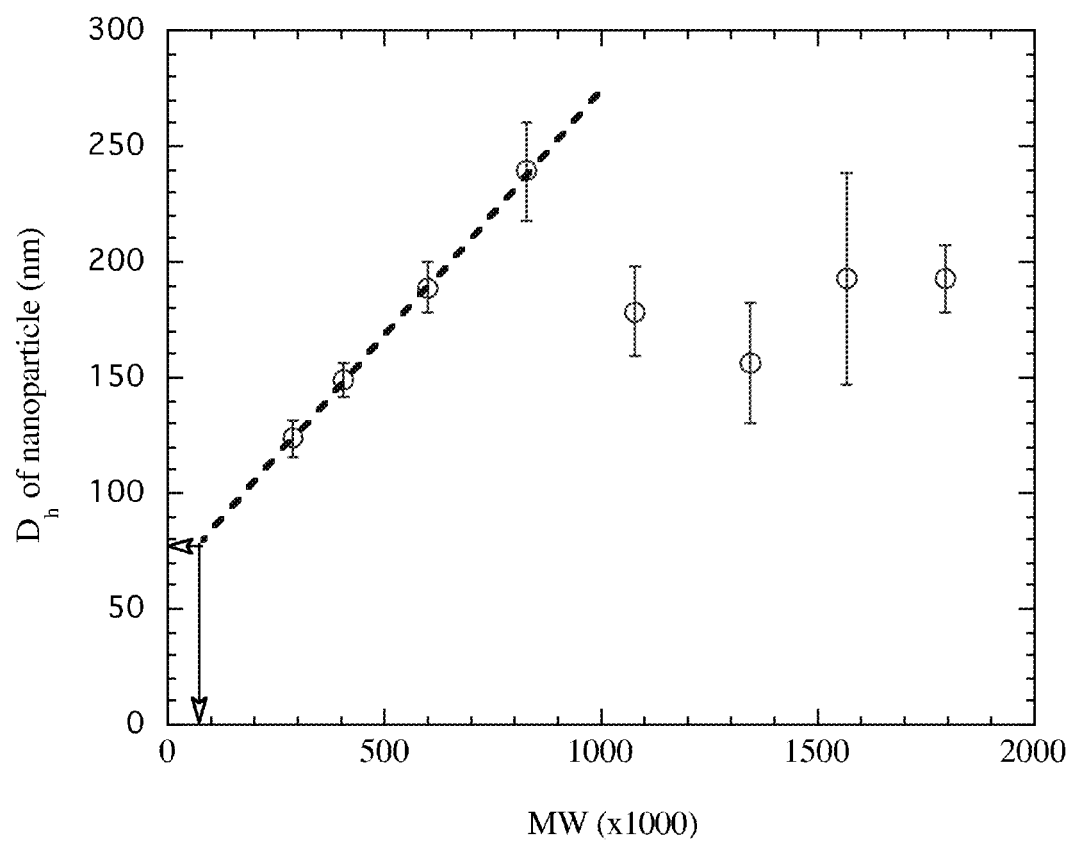
FIG. 5 shows the hydrodynamic diameter of nanoparticles measured with Dynamic Light Scattering (DLS) as described in Example 1. Abscissa represents MW of the copolymer that comprises each nanoparticle.

According to FIG. 4, MW of produced copolymer is increased as more ECA is added to a given amount of BSA. FIG. 5 shows that the size of nanoparticle increases as more ECA is attached to each protein molecules. It is expected that the binding force of nanoparticle with longer PECA chain to a hydrophobic surface will be enhanced to result in firmer binding. When the MW of the constituent copolymer exceed ca. 1,000 kDa, however, nanoparticles became very unstable, formed large aggregates, and slowly precipitated at the bottom of the bottle. Before the trend of DLS data reaches the unstable region, the hydrodynamic diameter of nanoparticles was proportional to MW of constituent copolymer. When this trend was extrapolated to lower MW region until it reached MW of BSA molecule (shown by the arrow on abscissa in FIG. 5), the diameter of the hydrophilic core, i.e., BSA cluster was found to be around 80 nm. From this observation, it was possible to obtain an overview of the individual particle structure. It is concluded that the diameter of nanoparticles grew from 80 nm to ca. 250 nm, and became unstable as the hydrophobic moiety grew further.

The adsorption behavior of nanoparticles composed of MW 410 k Da copolymer was measured with QCM. As the sensor was exposed to nanoparticle material, there was a decrease in the frequency shift values and a corresponding increase in the dissipation values. Upon rinsing away the nanoparticle solution with nanopure water, frequency shift values increased to levels well below that at the start of the measurement, indicating mass was adsorbed onto the surface. There was also a simultaneous decrease in the dissipation shifts to levels above the initial values, indicating that the adsorbed mass was dissipative in nature. Responses of the crystal at the $3^{rd}$, $5^{th}$, $7^{th}$, $9^{th}$, 11th and $13^{th}$ overtones were obtained, but only the data from $3^{rd}$ overtone was displayed in the figure for clarity. The vertical dotted lines highlight the moments during the measurement where the crystal was exposed to water, 35% aqueous ethanol, nanoparticles in 35% aqueous ethanol, and water, respectively. Regardless of the procedure for inducing adsorption of nanoparticles, our concern is on the data obtained after rinsing the crystal with water (i.e., final stage of the experiment). Frequency shifts and dissipation factors from nanoparticles with varying MW are summarized in Table 1.

Table 1 displays the final $\Delta f$ and $\Delta D$ values, demonstrating that more mass was adsorbed onto the surface as MW of the constituent copolymer of the nanoparticle was increased. Table 1 also demonstrates that the $\Delta D$ increased with MW of the constituent copolymer of the nanoparticles, indicating that adsorbed nanoparticle becomes more viscoelastic as its PECA moiety is larger. In this situation, calculation of the amount of adsorbed mass by Sauerbrey equation will yield underestimated value (Höök et al., ibid). These values were included in Table 1 as a reference. Although these values are not accurate, it is obvious that the adsorbed mass increases as the MW of constituent copolymer increases. Most importantly, this observation shows that all the examined nanoparticles showed good adsorption behavior that is not dependent on the size of hydrophobic moiety (i.e., PECA fraction).

The nanoparticles thus produced readily adsorb to hydrophobic surfaces. This property was examined by applying the nanoparticle suspension on a plastic surface and washing with water. This simple treatment changed the wetting property of hydrophobic surfaces dramatically. The difference between treated surface and untreated one has been demonstrated. Before treating the surface with nanoparticle suspension, water spray left droplets on the surface, while the treatment caused the surface to be wetted with a thin water layer.

CONCLUSIONS

In this example, it is shown that proteins can be used as an initiator for the production of cyanoacrylate nanoparticles. Unlike conventional procedures to fabricate cyanoacrylate nanoparticles, the presented procedure does not require stabilizers because the produced nanoparticles are composed of amphiphilic copolymers. The produced nanoparticle has a strong adsorption characteristic that changes the wetting property of hydrophobic materials. Since the average diameter of adsorbed nanoparticles is smaller than the wavelength of visible light, transparent materials such as glass or Plexiglas can be coated with the presented nanoparticles without deteriorating transparency. This characteristic is useful for improving visibility on rainy days because water-droplet formation on the surface of nanoparticle-coated windows will be suppressed.

It is understood that the foregoing detailed description is given merely by way of illustration and that modifications and variations may be made therein without departing from the spirit and scope of the invention.

TABLE 1

| QCM data (average of six overtones). Error bars are ±1 SD; n = 6. | | | |
| --- | --- | --- | --- |
| MW (×1000) | $\Delta f_{avg}$ (Hz) | $\Delta D_{avg}$ (×$10^{-6}$) | Adsorbed mass[1] (µg/cm$^2$) |
| 290 | −78 ± 3 | 4.7 ± 0.2 | 1.37 ± 0.06 |
| 410 | −97 ± 9 | 10.8 ± 0.5 | 1.71 ± 0.15 |
| 600 | −139 ± 15 | 19.0 ± 1.6 | 2.4 ± 0.3 |
| 830 | −146 ± 20 | 23.7 ± 1.8 | 2.7 ± 0.4 |
| 1080 | −170 ± 19 | 24.2 ± 1.6 | 3.0 ± 0.3 |
| 1340 | −170 ± 30 | 35 ± 5 | 3.0 ± 0.5 |
| 1570 | −240 ± 30 | 42 ± 4 | 4.2 ± 0.5 |
| 1790 | −240 ± 30 | 38 ± 3 | 4.2 ± 0.5 |

[1]The investigated nanoparticles do not form rigid films, but the Sauerbrey equation was used to roughly estimate the thickness of films.

I claim:

1. Nanoparticles comprising a protein-poly(aliphatic-cyanoacrylate) copolymer produced by a method comprising:
    a) preparing a solution of a protein in an acidified aqueous organic solvent mixture;
    b) adding an aliphatic-cyanoacrylate and mixing under conditions effective to react with said protein and produce nanoparticles of a protein-poly(aliphatic-cyanoacrylate) copolymer; and
    c) recovering said nanoparticles of said protein-poly(aliphatic-cyanoacrylate) copolymer; wherein said copolymer is represented by the following formula

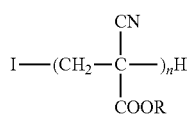

wherein n is an integer greater than 1, I is a protein, and R is an aliphatic hydrocarbon moiety, which may be a branched or straight chain, saturated or unsaturated, and optionally substituted.

2. The nanoparticles according to claim 1, wherein said aliphatic-cyanoacrylate comprises a C1 to C8 alkyl-cyanoacrylate.

3. The nanoparticles according to claim 1, wherein said protein comprises a protein from plant, animal, microbial or synthetic origin.

4. The nanoparticles according to claim 1, wherein said aliphatic-cyanoacrylate comprises a C1 to C8 aliphatic-cyanoacrylate.

5. The nanoparticles according to claim 1, wherein said alkylcyanoacrylate are selected from the group consisting of methyl-2-cyanoacrylate, ethyl-2-cyanoacrylate, n-propyl-2-cyanoacrylate, isopropyl-2-cyanoacrylate, n-butyl-2-cyanoacrylate, isobutyl-2-cyanoacrylate, n-pentyl-2-cyanoacrylate, isopentyl-2-cyanoacrylate, 3-acetoxypropyl-2-cyanoacrylate, 2-methoxypropyl-2-cyanoacrylate, 3-chloropropyl-2-cyanoacrylate, alkenyl-2-cyanoacrylate, alkoxyalkyl-2-cyanoacrylates or combinations thereof.

6. The nanoparticles according to claim 1, wherein said aqueous organic solvent mixture comprises methanol, ethanol, propanol, acetic acid, acetonitrile, acetone or a combination thereof.

7. The nanoparticles according to claim 6, wherein said aqueous organic solvent mixture comprises between about 10% to 100% organic solvent, based on the total weight of the aqueous organic solvent mixture.

8. The nanoparticles according to claim 7, wherein said aqueous organic solvent mixture comprises between about 30% to about 70% ethanol, based on the total weight of the aqueous organic solvent mixture.

9. The nanoparticles according to claim 1, wherein said alkyl-cyanoacrylate is reacted with said protein without addition of a catalyst or additional polymerization initiator.

10. The nanoparticles according to claim 1, wherein said nanoparticles comprise a mean diameter between about 50 to about 500 nm.

11. The nanoparticles according to claim 1, wherein said aliphatic-cyanoacrylate is provided in an amount relative to said protein between about 19:1 to about 1:1, by weight.

12. The nanoparticles according to claim 1, wherein R is a C1 to C8 aliphatic hydrocarbon.

13. The nanoparticles according to claim 1, wherein R is a C1 to C8 alkyl moiety.

14. The nanoparticles according to claim 1, wherein said copolymer is amphiphilic with the protein moieties being hydrophilic and the cyanoacrylate moieties being hydrophobic.

15. The nanoparticles according to claim 1, wherein said nanoparticles when applied to the surface of an object modify the surface wetting properties of said object.

16. The nanoparticles according to claim 15, wherein said surface at least partially comprises a hydrophobic surface.

17. The nanoparticles according to claim 16, wherein said surface is transparent, translucent or opaque.

18. The nanoparticles according to claim 17, wherein said surface comprises glass, plexiglass, an organic polymer, an inorganic material or combinations thereof.

19. The nanoparticles according to claim 18, wherein said surface is exposed to water.

20. A method for making nanoparticles comprising a protein-poly(aliphatic-cyanoacrylate) copolymer of claim 1, said method comprising:
a) preparing a solution of a protein in an acidified aqueous organic solvent mixture;
b) adding an aliphatic-cyanoacrylate and mixing under conditions effective to react with said protein and produce nanoparticles of a protein-poly(aliphatic-cyanoacrylate) copolymer; and
c) recovering said nanoparticles of said protein-poly(aliphatic-cyanoacrylate) copolymer.

21. The method of claim 20 wherein said aliphatic-cyanoacrylate comprises a C1 to C8 aliphatic-cyanoacrylate.

22. The method of claim 21 wherein said aliphatic-cyanoacrylate comprises a C1 to C8 alkyl-cyanoacrylate.

23. The method of claim 21 wherein said alkylcyanoacrylate are selected from the group consisting of methyl-2-cyanoacrylate, ethyl-2-cyanoacrylate, n-propyl-2-cyanoacrylate, isopropyl-2-cyanoacrylate, n-butyl-2-cyanoacrylate, isobutyl-2-cyanoacrylate, n-pentyl-2-cyanoacrylate, isopentyl-2-cyanoacrylate, 3-acetoxypropyl-2-cyanoacrylate, 2-methoxypropyl-2-cyanoacrylate, 3-chloropropyl-2-cyanoacrylate, alkenyl-2-cyanoacrylate, alkoxyalkyl-2-cyanoacrylates or combinations thereof.

24. The method of claim 20 wherein said aqueous organic solvent mixture comprises methanol, ethanol, propanol, acetic acid, acetonitrile, acetone or a combination thereof.

25. The method of claim 24 wherein said aqueous organic solvent mixture comprises between about 10% to 100% organic solvent, based on the total weight of the aqueous organic solvent mixture.

26. The method of claim 25 wherein said aqueous organic solvent mixture comprises between about 30% to about 70% ethanol, based on the total weight of the aqueous organic solvent mixture.

27. The method of claim 20 wherein said aliphatic-cyanoacrylate is reacted with said protein without addition of a catalyst or additional polymerization initiator.

28. The method of claim 20 wherein said nanoparticles comprise a mean diameter between about 50 to about 500 nm.

29. The method of claim 20 wherein said protein comprises a protein from plant, animal, microbial or synthetic origin.

30. The method of claim 20 wherein said aliphatic-cyanoacrylate is provided in an amount relative to said protein between about 19:1 to about 1:1, by weight.

31. A method for modifying the surface wetting properties of an object comprising applying said nanoparticles of claim 20 onto the surface thereof in an amount effective to alter the surface-wetting property thereof.

32. The method of claim 31 wherein said surface at least partially comprises a hydrophobic surface.

33. The method of claim 31 wherein said surface is transparent, translucent or opaque.

34. The method of claim 31 wherein said surface comprises glass, plexiglass, an organic polymer, an inorganic material or combinations thereof.

35. The method of claim 32 wherein said surface is exposed to water.

* * * * *